(12) United States Patent
Webb et al.

(10) Patent No.: US 7,165,339 B2
(45) Date of Patent: Jan. 23, 2007

(54) MEASURING APPARATUS WITH TAPE MEASURE AND PENDULUM FOR PLUMBING

(76) Inventors: Andrew Webb, 137 Seafield, Killiney, Country Dublin (IE); Michael Meagor, 33 Woodbine Drive, Raheny, Dublin 5 (IE)

( * ) Notice: Subject to any disclaimer, the term of this patent is extended or adjusted under 35 U.S.C. 154(b) by 43 days.

(21) Appl. No.: 10/527,145

(22) PCT Filed: Sep. 3, 2003

(86) PCT No.: PCT/IE03/00118

§ 371 (c)(1),
(2), (4) Date: Mar. 8, 2005

(87) PCT Pub. No.: WO2004/025212

PCT Pub. Date: Mar. 25, 2004

(65) Prior Publication Data

US 2005/0246917 A1     Nov. 10, 2005

(30) Foreign Application Priority Data

Sep. 10, 2002    (IE) ............................... S2002/0732

(51) Int. Cl.
  *G01B 3/10* (2006.01)
  *G01C 9/12* (2006.01)
(52) U.S. Cl. ............................. 33/760; 33/354; 33/764
(58) Field of Classification Search .................. 33/354, 33/392, 395, 397, 398, 399, 400, 401, 402, 33/451, 755, 760, 764, 768
See application file for complete search history.

(56) References Cited

U.S. PATENT DOCUMENTS

| | | | | | |
|---|---|---|---|---|---|
| 2,571,287 | A | * | 10/1951 | Peters | 33/354 |
| 2,576,041 | A | * | 11/1951 | Pitts | 33/755 |
| 2,578,062 | A | * | 12/1951 | Greene | 33/354 |
| 3,448,525 | A | * | 6/1969 | Majewski | 33/392 |
| 3,514,863 | A | * | 6/1970 | Moll | 33/764 |
| 3,760,766 | A | * | 9/1973 | Wopschall | 33/764 |
| 4,700,489 | A | * | 10/1987 | Vasile | 33/760 |
| 4,793,069 | A | * | 12/1988 | McDowell | 33/528 |
| 5,075,977 | A | | 12/1991 | Rando | |
| 5,768,797 | A | * | 6/1998 | Trevino | 33/759 |
| 5,873,174 | A | | 2/1999 | Kraft | |
| 6,105,794 | A | * | 8/2000 | Bauer | 248/235 |
| 6,223,446 | B1 | | 5/2001 | Potter | |
| 2002/0011007 | A1 | | 1/2002 | Byrd | |
| 2004/0172846 | A1 | * | 9/2004 | McRae | 33/760 |

FOREIGN PATENT DOCUMENTS

| | | |
|---|---|---|
| DE | 196 46 779 | 5/1998 |
| FR | 2 405 461 | 5/1979 |
| WO | WO 98/38471 | 9/1998 |

OTHER PUBLICATIONS

International Preliminary Examination Report Issued in PCT/IE03/00118 on Sep. 30, 2004.

* cited by examiner

*Primary Examiner*—G. Bradley Bennett

(57) ABSTRACT

A measuring apparatus comprises a handle 22 having a tape-holder 26' and pendulum 24 attached thereto such that a measuring tape 30 can extend to a variable extent sideways out of the tape-holder with the pendulum hanging vertically downwards. In the preferred embodiment there are two tape holders 26', 26" which are rotatable on the handle about the axis of the pendulum.

8 Claims, 8 Drawing Sheets

MEASURING APPARATUS WITH TAPE MEASURE AND PENDULUM FOR PLUMBING

CROSS REFERENCE TO RELATED APPLICATIONS

This application is the U.S. National Phase of PCT/IE2003/000118, filed on Sep. 3, 2003, which claims priority to Irish Patent Application No. S20020732 filed on Sep. 10, 2002, the contents of which are incorporated by reference herein.

The present invention relates to a measuring apparatus.

In the field of constructing partially pre-fabricated buildings such as conservatories, it is known to first dig a foundation trench conforming generally to the outline of the building. A foundation wall or footings on which the pre-fabricated components of the building are to be located is then constructed (usually in block or brick) on concrete strip foundations within the trench. In general most such buildings are designed specifically for the site on which they are constructed, and the individual pre-fabricated components will be produced specifically for the building. To reduce the overall completion time for such buildings it is desireable to be able to carry out the foundation work on site while the pre-fabricated components are produced in a factory. If this is to be done, it is critical that the foundation brickwork conforms closely to the final structure of the pre-fabricated portion of the building.

Referring now to FIG. 1, there is shown a trench 10 for a partially pre-fabricated building. The difficulty in laying out the path of the foundation brickwork within the trench is that, if one takes a datum point at some point within the trench, this will not be accessible to all measurement points M1 . . . M4 within the trench. Alternatively, if one takes a datum point D0 on say the external wall of a building to which the pre-fabricated building is to be added, there is a difficulty in obtaining a true measurement from this point to all the required measurement points within the trench which again may not be accessible from the datum point.

According to a first aspect of the present invention there is provided a measuring apparatus comprising a handle having a tape-holder and pendulum attached thereto such that a measuring tape can extend to a variable extent sideways out of the tape-holder with the pendulum hanging vertically downwards.

In the present specification the term "tape-holder" means a housing containing a measuring tape which can be drawn from the housing to a variable extent, and the term "tape" means any highly elongate, flexible member capable of being wound. The tape may have a flat, curved, circular or any other suitable cross-section. The tape need not include human readable indicia and may, for example, be electronically readable to produce a measurement.

The invention further provides a kit of parts which can be assembled to form a measuring apparatus as specified above.

The invention further provides a measuring kit comprising a measuring apparatus or kit of parts as specified above and at least one wall bracket arranged to retain the free end of a tape extending from the tape holder.

Embodiments of the invention will now be described, by way of example, with reference to the accompanying drawings, in which.

Figure 2:
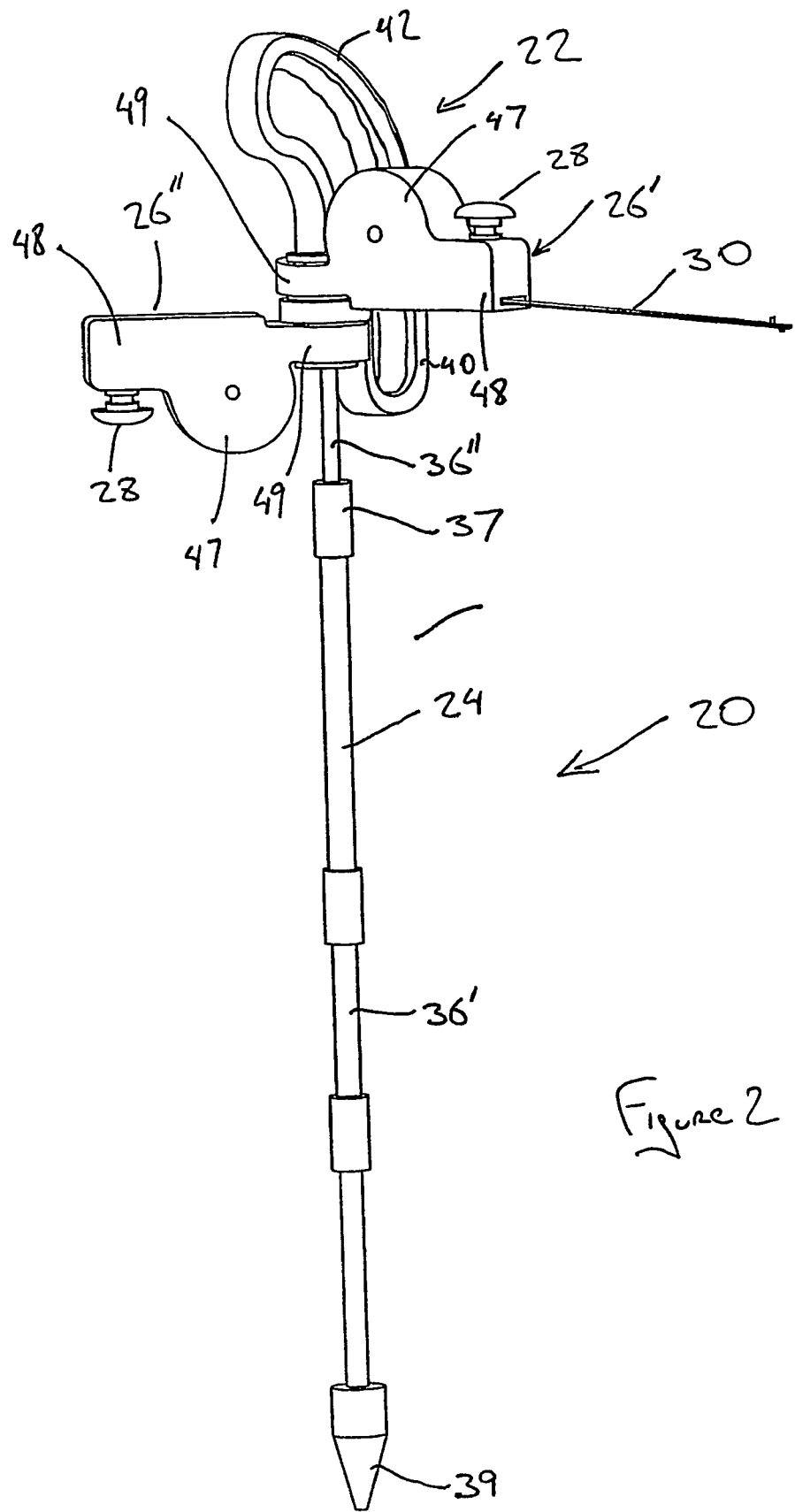
FIG. 2 is a pictorial view of a measuring apparatus according to a preferred embodiment of the invention.
Figure 3:
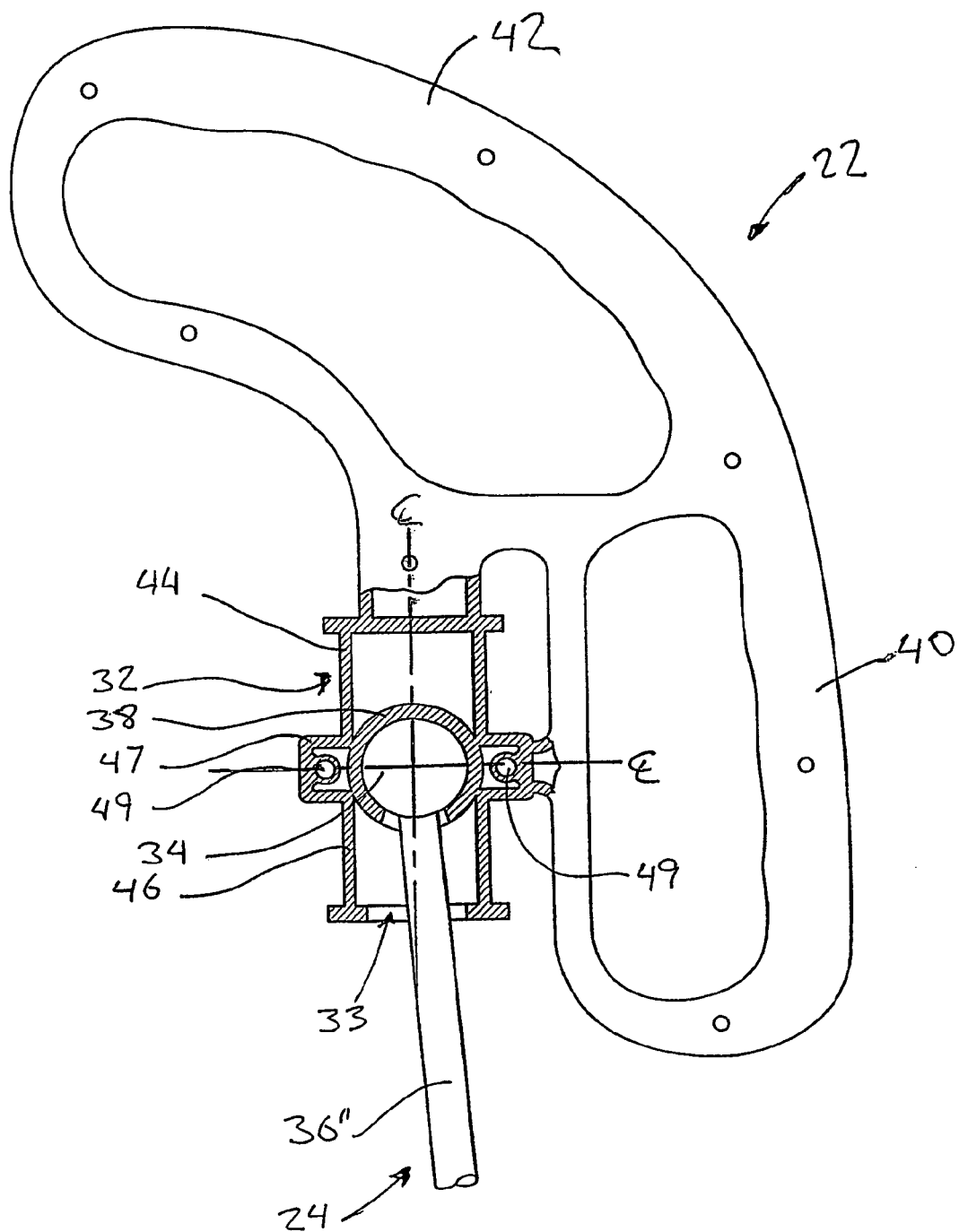
FIG. 3 is a cut-away view of a handle for the measuring apparatus of FIG. 2.
Figure 4:
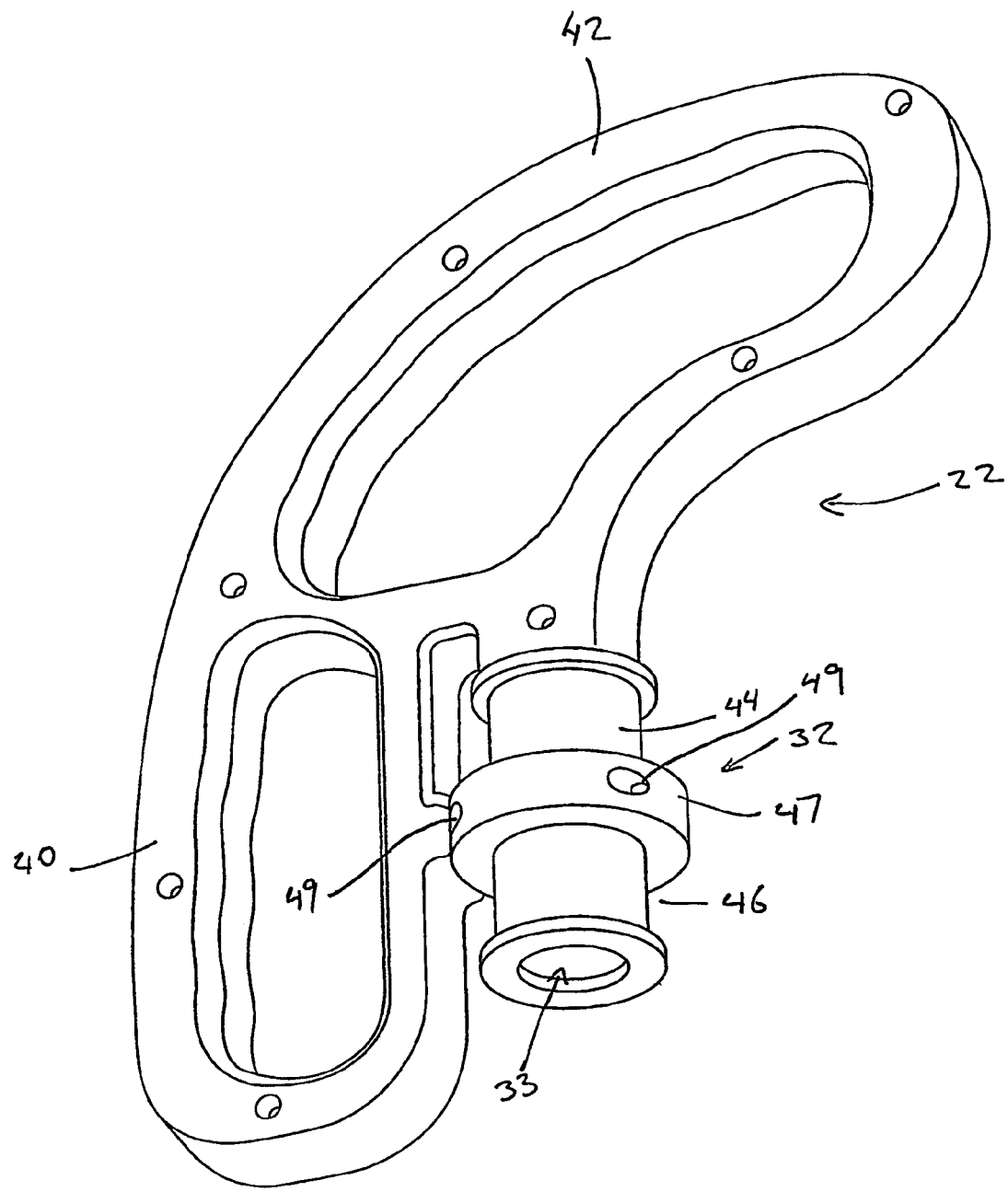
FIG. 4 is a detailed pictorial view of the handle of the measuring apparatus of FIG. 2.

FIGS. 2 to 4 show a measuring apparatus 20 according to a preferred embodiment of the present invention, FIG. 2 showing the apparatus 20 in its "in use" orientation. The apparatus comprises a handle 22 and an adjustable-length pendulum 24 hanging from the handle. The handle 22 includes a two-part cylindrical collar 32 having a circular opening 33 in its lower face. The pendulum 24 comprises an upper ball piece 34 having a downwardly extending arm 36" comprising the top end of the pendulum 24. The ball piece 34 is rotatably retained within a spherical socket 38 formed when the two parts of the collar 32 are assembled and the arm 36" extends through the circular opening 33 so that the pendulum is freely pivotable relative to the handle over a conical angle defined by the circular opening 33. Thus, when the handle 22, and thus the collar 32, is held upright as seen in FIG. 2 the pendulum 24 can hang freely vertically downwards.

The embodiment also comprises a pair of tape holders 26', 26". The tape holders 26', 26" are mounted on the collar 32 for independent rotation about the longitudinal axis of the collar 32. Thus, when the handle 22 is held upright, FIG. 2, the longitudinal axis of the collar is substantially vertical and coincident with the longitudinal axis of the pendulum 24. Each tape holder further includes a manually operable tape lock 28. When the lock 28 is open, a measuring tape 30 within the respective holder may be extended a required amount. The lock 28 may then be closed to hold the tape extended at the required amount. It will be appreciated that in the "in use" orientation of FIG. 2, i.e. with the pendulum 24 hanging freely vertically downwards, each tape extends sideways out of its respective holder, as seen for the tape 30 in FIG. 2.

In the preferred embodiment, the pendulum 24 is a rod which comprises the upper part 36" extending from the handle 22 and a separate three-section telescopic lower part 36', FIG. 2. The free end of the upper part 36" is threaded and screws into a threaded socket 37 in the lower part 36'. At the opposite end of the lower part 36', a weighted marker 39 retains a marking tip which can comprise, for example, a scribe point, chalk, a drill bit or a nail (not shown). Making the pendulum part 36' detachable enables the apparatus to be more compactly stored and transported while the telescopic part 36' allows the distance from the marking tip to the centre of the ball piece 34 to be adjusted.

The remainder of the handle 22 is generally planar and includes two grip portions 40, 42. The lower grip portion 40 is disposed to one side of the collar 32 and the upper grip portion 42 extends from the lower grip portion to be generally disposed over the collar 32. When the free end of a tape 30 extending from the holder 26' or 26" is retained, pulling on the lower grip portion 40 will draw tape from the holder or, if the tape is locked, tighten the tape. The upper grip portion 42 can be held so as to maintain the handle generally upright as seen in FIG. 2.

Referring particularly to FIG. 3, the collar 32 comprises upper and lower cylindrical seats 44, 46 around which the respective tape holders 26', 26" are located. The seats 44, 46 are divided by a hub 47 of wider diameter than the seats. As mentioned the collar 32 is formed in two parts which are assembled together, these parts being opposite generally semi-circular halves of the collar (i.e. the collar is split along a plane passing through its longitudinal axis). Each half of the collar 32 includes a pair of channels 49 formed opposite one another in the hub 47 and which lie in register when the collar is assembled. A pair of screws (not shown) or other suitable mechanism are then passed through the hub channels 49 to fix the halves of the collar together around the ball piece 34 of the pendulum marker 24.

Figure 5:
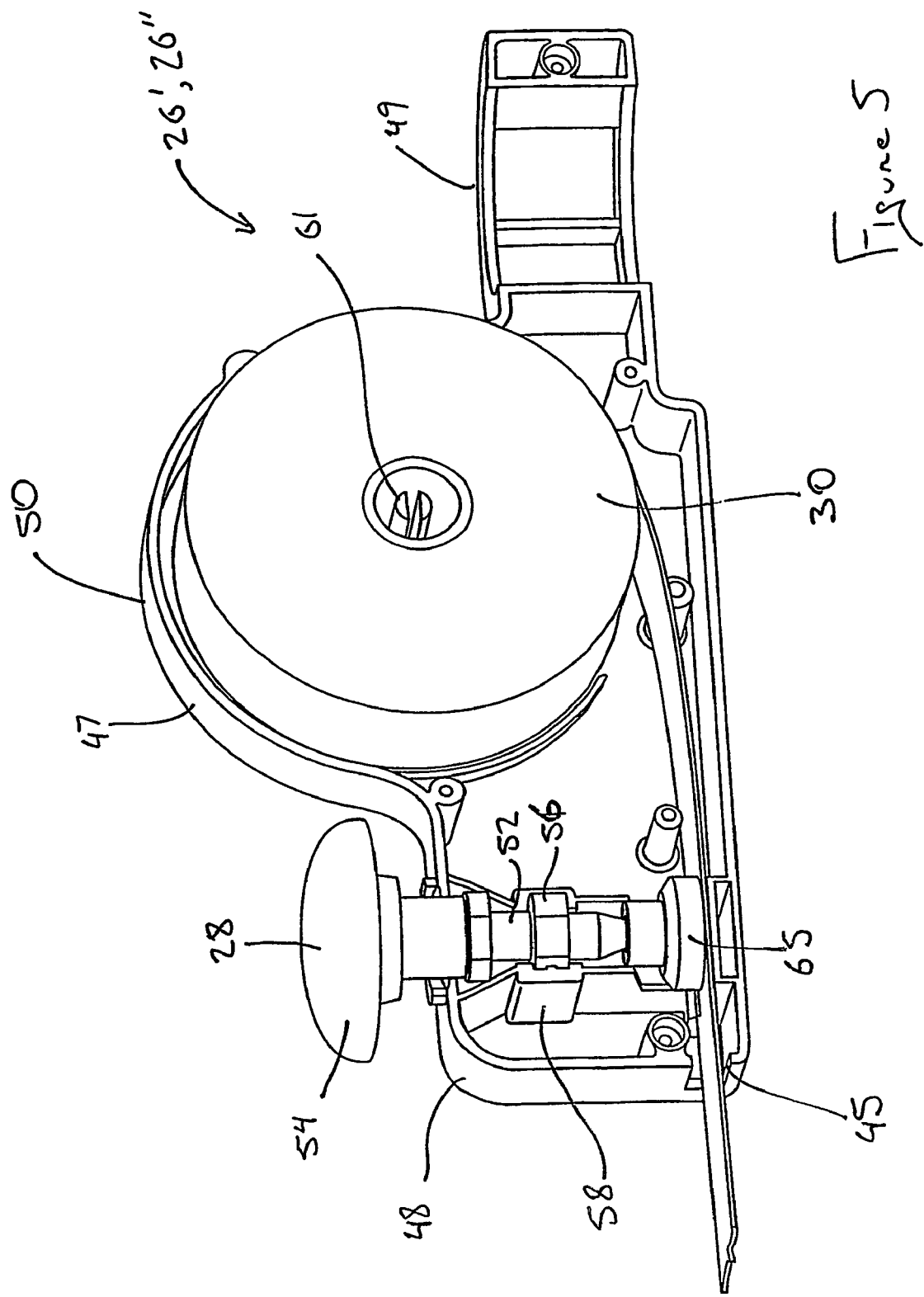
FIG. 5 is a cut-away view of a tape-holder for the measuring apparatus of FIG. 2.

Referring to FIG. 5, in the preferred embodiment, each tape holder 26', 26" comprises a two part housing 50 (only one shown). The main portion 47 of the housing 50 is generally circular. In at least one part 50 a hub 61 extends from the centre of the main portion 47 and the tape 30 is wound around the hub 61. Preferably, the tape is spring loaded on the hub 61, causing it to retract if the tape lock is open and the tape is not being held. Where the tape is not spring loaded, the hub 61 can be rotatably mounted in and extend through the side wall of the housing where a crank (not shown) can be attached to the hub to allow for manual re-winding of the tape. In a further alternative, the hub 61 could again be rotatably mounted and motor driven with the motor being powered by batteries located within the housing 50. The choice of retraction mechanism is generally dependent on the length and weight of tape which may need to be retracted. So for very long tapes, spring force alone may not be sufficient to retract the tape and a crank or motor may be required, whereas for shorter tapes using a spring alone allows a simple closed housing to be employed.

In any case, a tape dispensing section 48 extends from one side of the main portion 47 and retains the tape lock 28. The dispensing section 48 further includes a tape exit slot 45 from which the tape 30 extends from the housing 50. The tape lock 28 comprises a shaft 52 which extends from the dispensing section 48 where it is capped by a button 54. The shaft 52 includes a threaded section 56 which is located within a corresponding retaining wall 58 formed within the dispensing section 48. At the internal end of the shaft 52 a tape engaging pad 65 is located. When the button 54 is twisted in one direction, the pad 65 engages the tape 30 to lock it in position and vice versa to free the tape. It will be seen that many variations of tape lock are employable with the invention and the lock shown is for exemplary purposes only.

A ring section 49 extends from the opposite side of the main portion. The two parts of each housing 50 comprising the tape holders 26', 26" are fixed together to locate their respective ring portions 49 around the upper and lower seats 44, 46.

As shown in FIG. 2, the holder 26' is mounted about the upper seat 44 with the tape lock 28 disposed upwardly, and the holder 26" is mounted about the lower seat 46 with the tape lock 28 disposed downwardly. The tapes 30 extending from the holders 26', 26" lie in respective substantially horizontal planes located equally above and below the centre of rotation of the ball piece 34 within the collar 32. It will be seen that in order to minimize error the planes of the tapes should be as close as possible and ideally coplanar with the centre of the ball piece 34.

It will be seen that, because of the inverted orientation of the holder 26", the tape 30 is preferably loaded within the housing so that its graduations are visible from above. The tape 30 is also loaded within the housing of the holder 26' so that its graduations are visible from above. (In any case, it will be seen that tapes can be provided with markings on both surfaces.)

Figure 6:
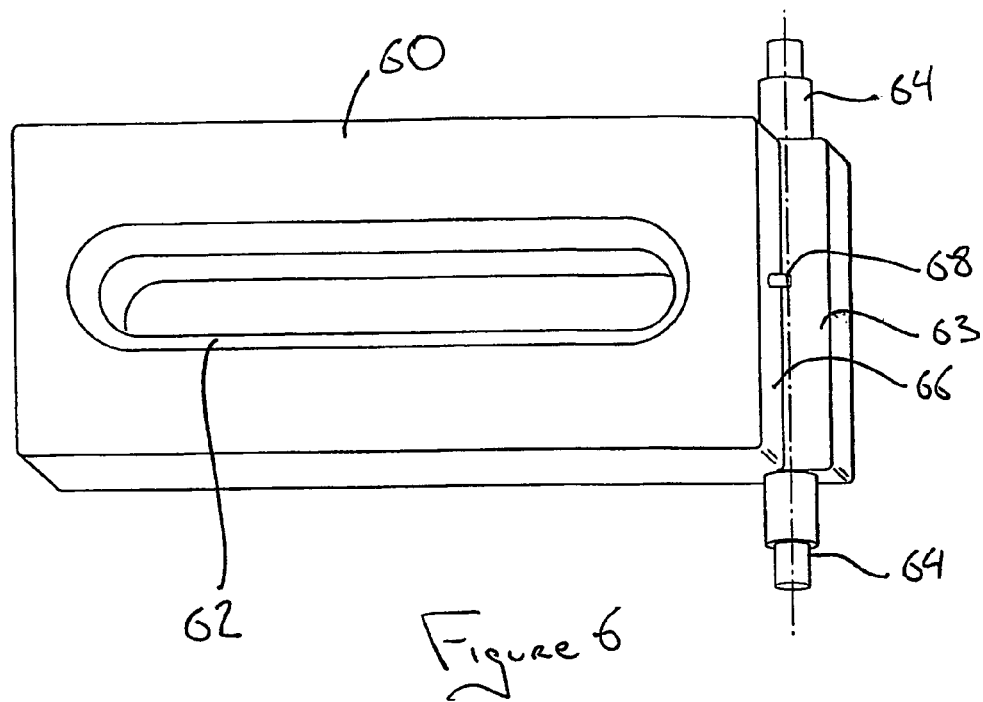
FIG. 6 is pictorial view of a wall bracket with datum point spigots operable with the measuring apparatus of FIG. 2.

Referring now to FIG. 6, there is shown a wall bracket 60 cooperable with the measuring apparatus 20. The bracket 60 comprises a rectangular body on which a longitudinal countersunk slot 62 is formed. One short-end of the bracket 60 is stepped to form a reduced depth portion 63. A pair of coaxial spigots 64 having reduced diameter ends project from opposite sides of the reduced depth portion 63. The step edge 66 interface of the reduced depth portion 63 and the main body of the wall bracket 60 lies along the centre line of the spigots 64. A pin 68 projects from the step edge 66.

Figure 1:
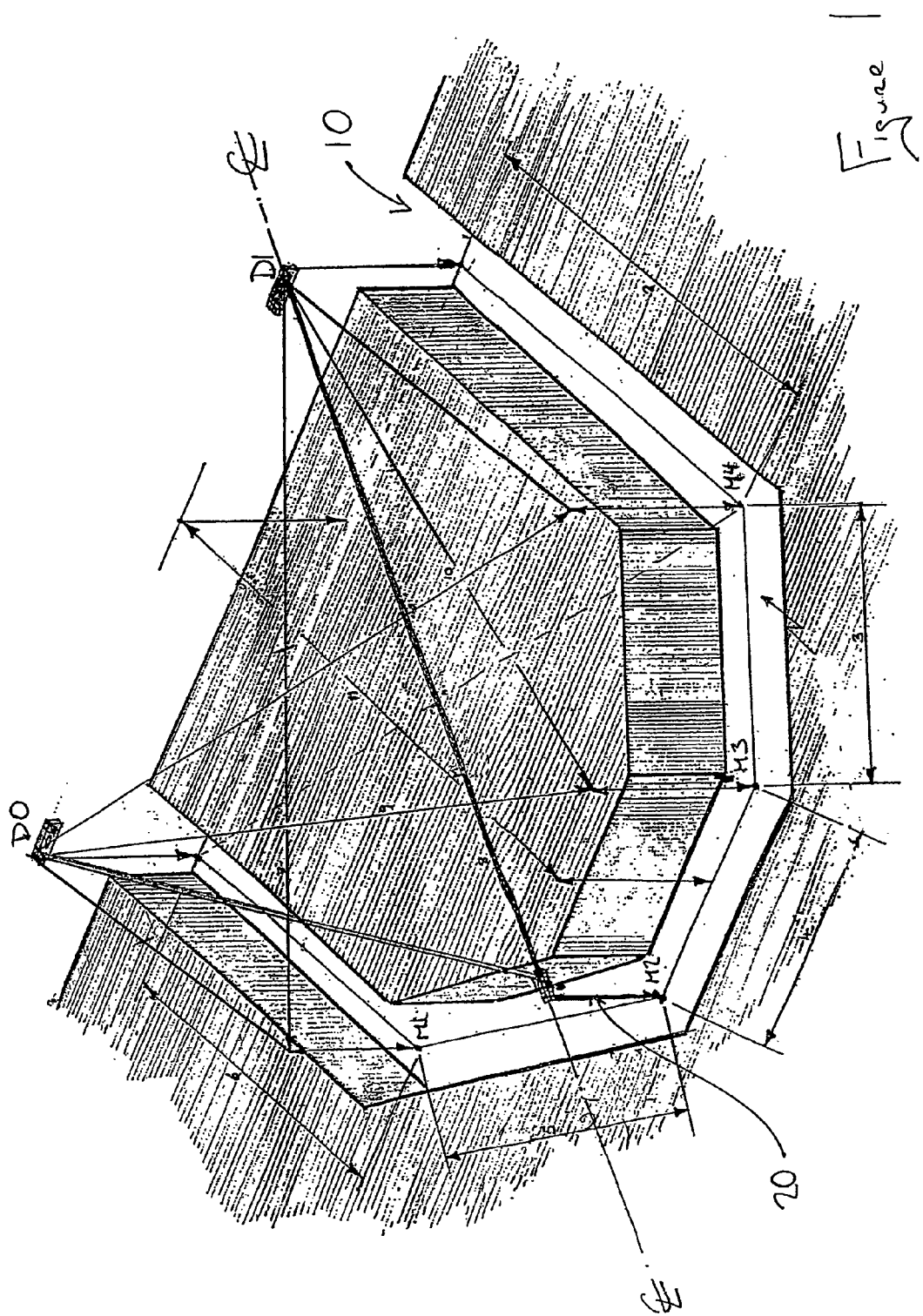
FIG. 1 shows a view of a foundation trench and concrete strip foundations for a partially pre-fabricated building.

In use, a pair of wall brackets D0, D1 of the type shown in FIG. 6 are screw fixed to setting out posts (not shown) or a wall of an existing building to which a partially prefabricated building is to be erected, FIG. 1. The screws are located in the slots 62 so that the separation of the brackets can be set to a required distance. This is measured by locating the end of a conventional tape over the pin 68 of a bracket 60 which has been fixed in position and dragging the tape towards the other bracket. The required distance is set at the step edge 66 of the other bracket which is then screw fixed in position.

It will be seen that it may be desirable to locate multiple brackets out of plane with one another, for example, when making measurements for trenches at least partially surrounding existing buildings. Thus, one bracket might be located at the corner of a wall with the spigot 64 protruding beyond the corner, whereas another bracket may be located around the corner. In order to correctly space the spigots on each bracket, the distance between the brackets which are out of plane with one another needs to be set.

Figure 9:
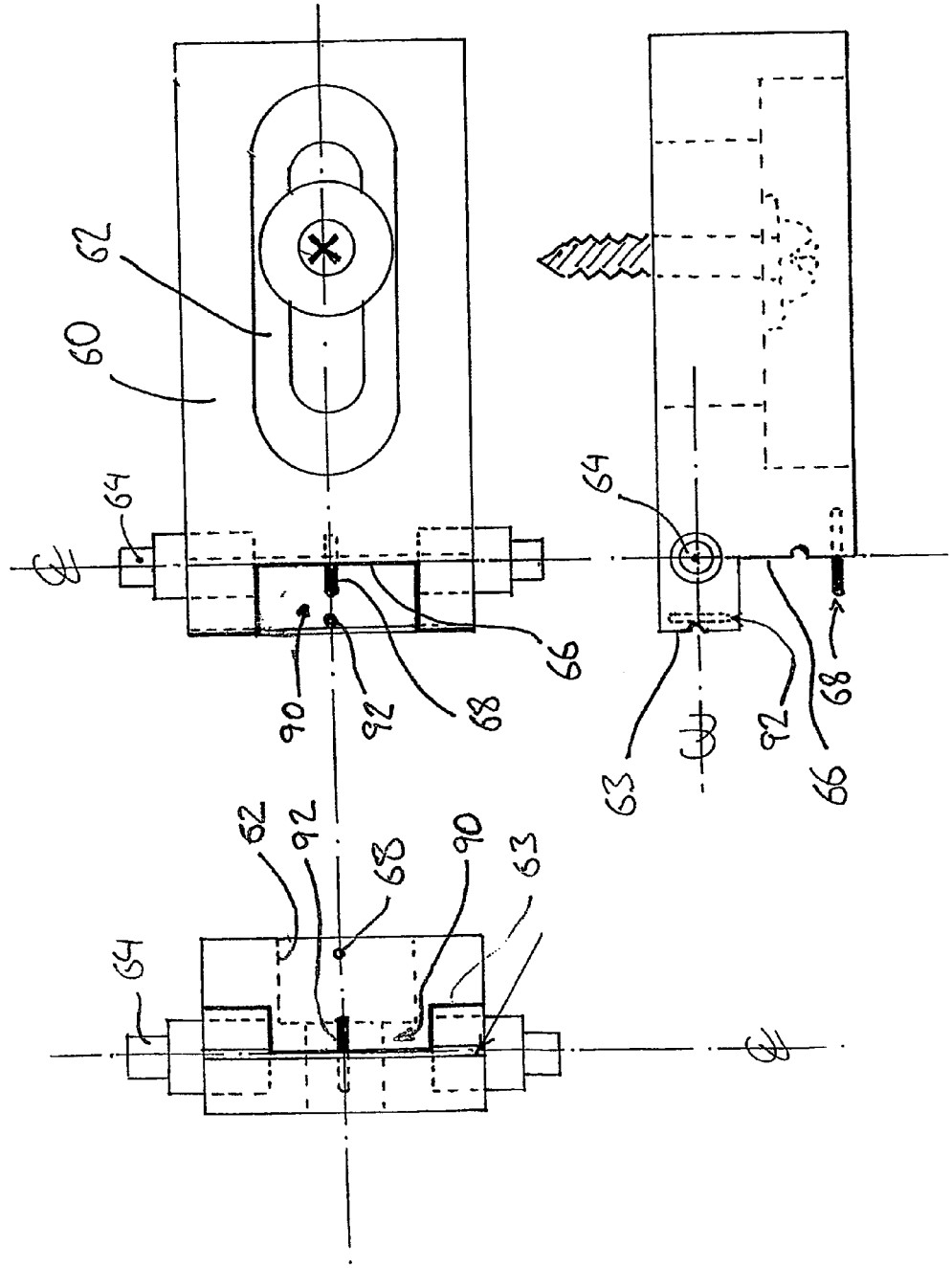
FIGS. 9(a) to (c) are orthogonal views of an alternative wall bracket.

Referring now to FIG. 9, which shows a variation of the bracket of FIG. 6 and in which like reference numerals refer to like parts. In this case, the reduced depth portion 63 of FIG. 7 includes a further recess 90 from which a second pin 92 projects. The pin 92 is orthogonal to the pin 68 and the floor of the recess 90 is co-planar with the centre of the spigot 64. Thus, a tape may be hooked over the pin 92 on a fixed bracket as before and dragged towards another bracket which is to be positioned on a non co-planar wall. The tape bears against the floor of the recess 92 so providing a set distance from the centre of the spigot 64 and either the floor of recess 90 or the step edge 66 on another bracket.

Figure 7:
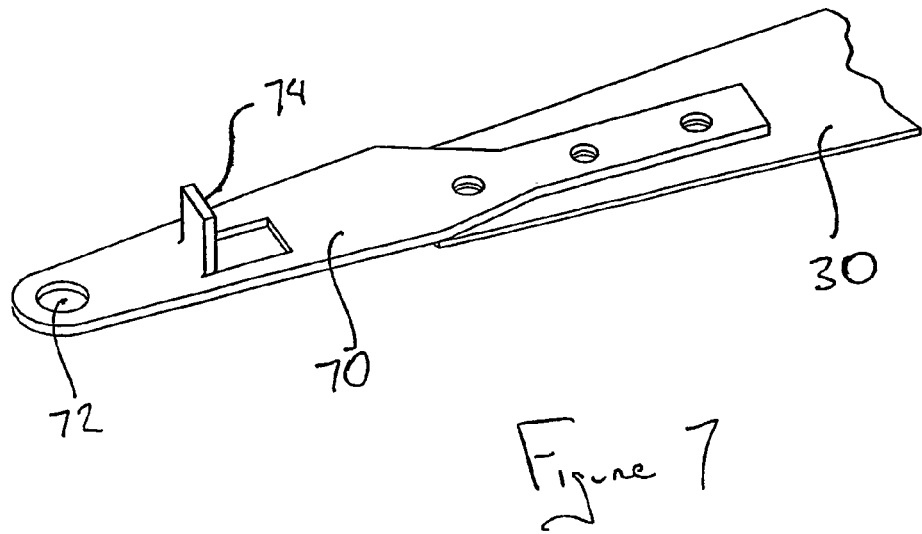
FIG. 7 is pictorial view of the end of a tape for the measuring apparatus of FIG. 2.

FIG. 7 shows the ends of the tapes 30. A tab 70 is fastened to the end of the tape. The tab 70 includes a hole 72 having a diameter suitable for locating the tab over a spigot 64 on a wall bracket 60. It should be noted that the graduations on the tape are calibrated from the centre of the hole 72, so that, with the tape extended, the measurement showing at the exit slot 45 of the tape dispensing section 48 is in fact the distance from the centre of the hole 72 to the centre of the ball piece 34, which in turn corresponds with the longitudinal axis of the arm 36", 36' when in a vertical state.

It should also be noted that the hole 72 lies on the centre line of the tape 30 and that the centre lines of the two tapes held in the housings 26', 26" intersect on the longitudinal axis of the arm 36", 36' when in a vertical state.

The operation of the apparatus of the preferred embodiment will be described in terms of the construction of a conservatory and in relation to FIG. 1. When the conservatory is designed, the layout of the foundation brickwork for the conservatory panels is provided to a builder as a set of co-ordinates. The first co-ordinate is the distance between the two wall brackets D0, D1. These are located above ground level and preferably above the eventual level of the foundation brickwork with their spigots 64 the required distance apart. The co-ordinates for each of the measurement points, in this case M1 . . . M4, are then provided as pairs of distances from the respective brackets D0, D1. Thus, for the first measurement point, the distance from D0 can be set on the tape 30 for housing 26' and the distance from D1 can be set on the tape 30 for housing 26". The ends of the respective tapes are located over the spigots 64 of the brackets D0, D1 and the measuring apparatus 20 is pulled away from the building until both tapes are taut. For marking the outline of the foundations trench (which need not be very accurate), the length of the arm 36", 36' can be set approximately as the distance from the spigots 64 on which the tapes are located (presumably level with one another) to ground level. The arm is then allowed to settle in a vertical state, the handle is then lowered to the ground and the location of the first measuring point is marked on the ground by the marker 39. The same technique is then employed for each of the remaining measuring points M2 . . . M4 using distances measured from D0 and D1 and the foundation trench is dug accordingly. A concrete foundation is laid in the trench and in the example of FIG. 1 this is shown as being level. The length of the arm is then adjusted to the depth of this level beneath the spigots 64 on which the tapes are located. If the trench were not level, then the length of the arm 36", 36' would need to be adjusted for measurement points on different levels. The measurement points M1 . . . M4 can in any case be accurately marked on the concrete foundations using the provided co-ordinates as before.

Preferably, the measurement points M1 . . . M4 and the wall brackets D0, D1 define the corners of the outside face of the foundation brickwork. It will be seen that as this brickwork is built up, it may be desireable to check that these measurement points are correct. As described above, the co-ordinates provided are based on the assumption that the centre of the spigots 64 are co-linear with the centre line of the tapes 30. However, the brickwork may make it impossible to deploy a tape along the original measurement path.

Figure 8:
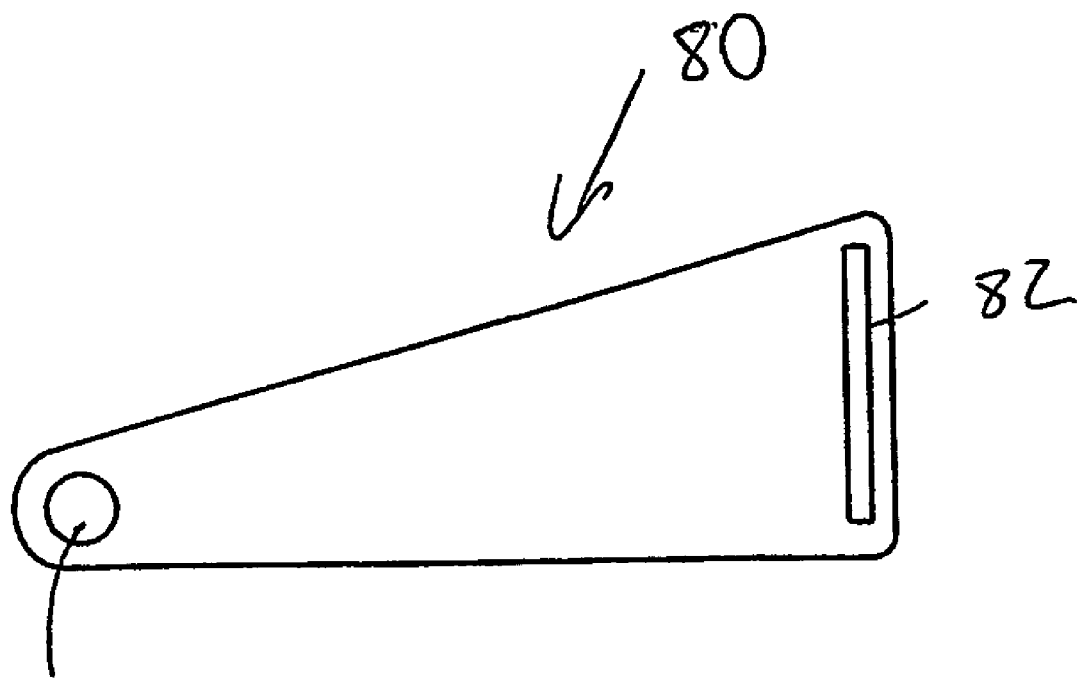
FIG. 8 is a plan view of an attachment cooperable with a tape measure for above ground level use.

Referring now to FIG. 8, there is shown a tape attachment 80. The attachment comprises a sheet having a transverse slot 82 and a hole 84 dimensioned to be located over the spigots 64. The slot 82 can either fit over a tab 74 projecting from the end of the tape 30, FIG. 7, or it can accommodate the tab at the end of a conventional tape. Once located on the tape, the centre of the hole 84 is then aligned with the edge of the tape and the correct measurements can be made where the wall might otherwise interfere with the tape.

The preferred embodiment has been described in terms of a generally flat tape 30 having human readable indicia printed thereon enabling an operator to read measurements directly from the surface of the tape. It will be seen, however, that the invention could equally be implemented without using such indicia or indeed a flat tape. For example, the tape could comprise wire of any suitable cross-section and the housing could include electronic circuitry arranged to detect the length of wire dispensed from the housing. This length could then be shown on a digital display located within the housing. The wire itself could include markers which could be read by a sensor to determine the length of wire dispensed.

Alternatively movement of the wire could be translated into movement of another member which movement is sensed by the electronic circuitry. So, for example, the wire could be wound once around a second hub located between the hub 61 and tape exit slot 45. Each rotation (or part rotation) of the second hub would correspond with a given length of dispensed wire. (The same would not be true of the hub 61.) Markers would be defined at regular intervals around the circumference of the second hub according to the resolution required. These markers could be of the type that can be optically, electronically or mechanically sensed to determine the degree of rotation of the second hub and so the length of wire dispensed. For such an embodiment, it may be useful to include a reset button or sensor which is actuated to indicate that the wire has been completely rewound and so the display should be reset in case any slippage or error has occurred.

It should be noted that where a narrow diameter wire is employed as a tape, the problem solved by the tape attachment 80 of FIG. 8 may not arise and so a corresponding attachment may not be required in this case.

In either of the above embodiments, a kit comprising the various components of the measuring apparatus and its accessories can include various further accessories. For example, extension pieces of known length can be provided for attachment to the end of the tapes, so enabling the invention to be deployed in larger scale applications.

It will be seen that the invention has been described in terms of a preferred embodiment having two tape holders. The invention, however, could also be implemented with an apparatus including only one tape. In one implementation, the sets of measurements would be as before, and the marker 39 would be used to scribe a series of arcs the required distances from each datum point. Where these arcs intersect then determines the location of the measurement points M1 . . . M4.

Alternatively, a single tape device could be employed with a separate telescopic layout frame (not shown). In this case, the set of co-ordinates provided would again include the distance between the datum points. However, the pairs of co-ordinates provided would include a first distance measured from one datum point and this enables an operator to scribe an arc that distance from the datum point; and a second distance being the distance from the last measurement point. (In this case of the first measured point, it would be assumed that the first measured point extends orthogonally away from the wall on which the datum point is fixed.) This enables the operator to scribe a second arc from the last measurement point using the telescopic layout frame. Where this arc and the arc scribed from the datum point using the measuring apparatus according to this variation intersect defines the next measuring point. This method, however, assumes that each measuring point is accessible from the last and is most easily performed when the foundation is all on the same level. It should also be seen, however, that this variation may involve accumulating error from one measurement point to the next, rather than in the first embodiment where each measured point is defined independently.

Other alternative embodiments are also possible for example, the preferred embodiment has been described in terms of a solid adjustable pendulum. In an alternative embodiment, a housing (not shown) for a plumb line is fixed to the otherwise free end of the arm 36". A marker similar to the marker 39 is attached to the otherwise free end of the plumb line. The plumb line may be extended to any desired length so making such an embodiment particularly useful for applications where deep foundation trenches are employed, but enabling compact storage of the pendulum component of the measuring apparatus when not in use.

As indicated above, the invention need not be used in relation to measurements made for buildings which are to be attached to existing buildings. Thus, the measurements provided can relate to foundation trenches which are completely remote from the location of the brackets D0, D1. Similarly, the brackets do not need to be fixed to a building. For example, setting out posts can be inserted at known locations (and elevations) on a site and the measurements can be taken from brackets mounted on these posts.

The invention claimed is:

1. A measuring apparatus comprising a handle, a first and second tape-holder mounted to said handle for independent rotation about a substantially common axis, each tape holder having a respective measuring tape, which can extend to a variable extent sideways out of the tape-holder when said common axis is vertical, and a pendulum mounted to said handle by a universal joint for hanging vertically downwards substantially coaxial with said common axis to indicate the point on the ground vertically below the tape holders, said pendulum being in the form of a multi-part length-adjustment rod.

2. The measuring apparatus as claimed in claim 1, wherein the pendulum has a marker at its free end.

3. A measuring apparatus as claimed in claim 1, wherein the handle has a socket and the upper end of the pendulum has a ball rotatably retained in the socket.

4. A measuring apparatus as claimed in claim 1, wherein each tap holder includes a tape lock for retaining the tape in a selected extended state.

5. A measuring apparatus as claimed in claim 1, wherein each tape holder includes means for detecting and displaying the extent to which a tape extends from the tape holder.

6. A measuring apparatus as claimed in claim 1, wherein the tape has a flat curved or circular cross-section.

7. A kit of parts which can be assembled to form a measuring apparatus as claimed in claim 1.

8. A measuring kit comprising a measuring apparatus or kit of parts as claimed in claim 1 and at least one wall bracket arranged to retain a free end of a tape extending from the tape holder.

* * * * *